United States Patent
Jung et al.

(10) Patent No.: US 7,244,899 B2
(45) Date of Patent: Jul. 17, 2007

(54) KEYPAD ASSEMBLY FOR PORTABLE TERMINAL

(75) Inventors: Sun-Tae Jung, Anyang-si (KR);
Dong-Hoon Jang, Suwon-si (KR);
Mun-Kue Park, Suwon-si (KR)

(73) Assignee: Samsung Electronics Co., Ltd.,
Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/348,782

(22) Filed: Feb. 7, 2006

(65) Prior Publication Data

US 2006/0289283 A1 Dec. 28, 2006

(30) Foreign Application Priority Data

Jun. 28, 2005 (KR) .................. 10-2005-0056494

(51) Int. Cl.
*H01H 9/20* (2006.01)
(52) U.S. Cl. .................................... 200/314
(58) Field of Classification Search ............. 200/5 A, 200/512, 310, 314, 317, 341, 406, 516; 341/22; 345/168–170; 379/368, 433.07
See application file for complete search history.

(56) References Cited

U.S. PATENT DOCUMENTS

| | | | |
|---|---|---|---|
| 5,661,279 A * | 8/1997 | Kenmochi | 200/314 |
| 5,711,588 A * | 1/1998 | Rudisill | 362/30 |
| 6,997,572 B2 * | 2/2006 | Ono et al. | 362/24 |
| 7,014,377 B2 * | 3/2006 | Yamauchi | 400/472 |
| 7,038,152 B2 * | 5/2006 | Watanabe | 200/314 |
| 7,067,753 B1 * | 6/2006 | Cheng | 200/310 |

FOREIGN PATENT DOCUMENTS

| | | |
|---|---|---|
| EP | 1265261 A2 | 12/2002 |
| GB | 2159654 A | 12/1985 |
| WO | WO 02/15211 | 2/2002 |

* cited by examiner

*Primary Examiner*—Michael A. Friedhofer
(74) *Attorney, Agent, or Firm*—Cha & Reiter, L.L.C.

(57) ABSTRACT

A keypad assembly for a portable terminal according to the present invention includes: a keypad having pad portions with a plurality of key buttons placed thereon, light guide plates disposed between the pad portions, and reflection units disposed on the light guide plates to direct the light toward the key buttons; light sources for providing the light toward the reflection units; a plurality of spacers disposed below the light guide plates for separating the light guide plate from a substrate and for supporting the light guide plates; switches disposed below the pad portions under the key buttons for applying signal to the substrate; and a casing for enclosing the keypad.

20 Claims, 5 Drawing Sheets

KEYPAD ASSEMBLY FOR PORTABLE TERMINAL

CLAIM OF PRIORITY

This application claims priority to an application entitled "Keypad Assembly for Mobile Phone," filed with the Korean Intellectual Property Office on Jun. 28, 2005 and assigned Serial No. 2005-56494, the contents of which are incorporated herein by reference.

BACKGROUND OF THE INVENTION

1. Field of the Invention

The present invention relates to a portable terminal such as cellular phones, Personal Digital Assistants (PDA), Personal Communication System (PCS), game phones, camera phones, Digital Multimedia Broadcasting (DMB) phones, and more particularly to a portable terminal having a lighting function to enable a user to dial another user at night.

2. Description of the Related Art

In general, "a portable terminal" implies an electronic device that a user can carry for communication with another user wirelessly. In consideration of portability, the design of such a portable terminal focuses not only toward a compactness, slimness, and lightness, but also toward providing multimedia capabilities to allow the user to enjoy a wider variety of functions. Thus, future portable terminals will be used in a multimedia environment to provide the Internet access and its related functions globally.

Currently, a conventional portable communication terminal allows a voice communication as well as a high-speed data communication. Further, as consumer's demands have increased, various services have been provided using a wireless communication technology for transmitting and receiving data at a high speed. Most portable terminals are now equipped with an embedded or an external camera lens to transmit image signals and the like.

The portable terminal typically includes data input and output units, data transmitting and receiving units, an antenna unit and the like. The data input unit includes a keypad assembly or a touch screen to input data. The keypad assembly is constructed with key buttons, silicon rubber, dome switches and the like. A well-known liquid crystal display unit is generally used as data output unit.

Moreover, the portable terminal has a lighting device for lighting the keypad and may include a plurality of light emitting diodes arranged on a printed substrate, or an inorganic electro luminescent body inserted in an elastic pad disposed on the printed substrate. FIG. 1 shows such a conventional keypad assembly 100, which includes a switch substrate 120, a plurality of light emitting diode 122, and a keypad 110.

The keypad 110 is made from an elastic material, i.e., silicon and other material made from the combination of silicone and a poly urethane film. The keypad 110 includes a plate-shaped elastic layer 111, a plurality of key buttons 112 having characters printed thereon and mounted on the elastic layer 111, and a plurality of protuberances 111a formed at a lower surface of the key pad 110. The key buttons 112 and the protuberances 111a are vertically aligned to each other.

The switch substrate 120 includes a plate-shaped printed substrate 120a and a plurality of switches 121 facing the protuberance 111a of the keypad 110. Each of the switches 121 is provided with a conductive contact and a metal dome entirely covering the conductive contact. The light emitting diodes 122 are disposed at predetermined positions on the printed substrate 120a.

However, in order to guarantee the operation of the switch 121, the light emitting diodes 122 are disposed on the printed substrate 120a, each of which is not vertically aligned to the corresponding key button 112. That is, the light emitting diodes 122 are disposed between the switches 121. As a result, the light emitted toward the respective key button 112 from the light emitting diode 122 diverges in all directions, so that the illumination of the key buttons 112 becomes non-uniform and dark. That is, as the light emitted from the light emitting diode is shed through the side of each key button, the number or characters printed on the respective key button cannot be displayed with a uniform brightness.

Therefore, in order to overcome the above-mentioned problems, it is necessary to use a larger number of light emitting diodes for lighting the key buttons, which increases the cost for assembling the light emitting diodes as well as electric power consumption of the light emitting diodes, thereby causing the manufacture of the keypad assembly to be economically inefficient.

SUMMARY OF THE INVENTION

Accordingly, the present invention has been made to solve the above-mentioned problems occurring in the prior art and provides additional advantages, by providing a keypad assembly for a portable terminal, which can be illuminated with a uniform brightness for the entire keypad.

One aspect of the present invention is to provide a keypad assembly for a portable terminal, which has a local light source for key buttons disposed at the edge of the keypad, thereby providing a uniform surface light source for the entire keypad.

Another aspect of the present invention is to provide a keypad assembly for a portable terminal, which has a light source consuming minimum electric power.

Still another aspect of the present invention is to provide a keypad assembly for a portable terminal, which has a top view-type light source instead of the side view-type light source, so that it can provide a uniform brightness.

In one embodiment, there is provided a keypad assembly for a portable terminal includes: a keypad including pad portions having key buttons placed thereon, light guide plates disposed between the pad portions, and reflection units disposed on the light guide plates to direct the light toward the key buttons; light sources for providing the light toward the reflection units; a plurality of spacers disposed below the light guide plates for separating the light guide plate from a substrate and supporting the light guide plates; switches disposed below the pad portions under the key buttons for applying signal to the substrate; and a casing for enclosing the keypad.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein is omitted to avoid making the subject matter of the present invention unclear.

Figure 1:
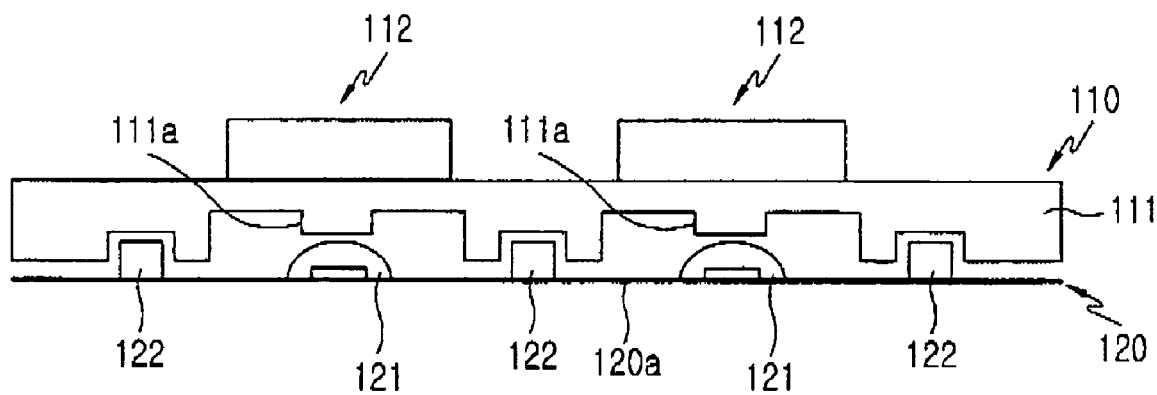
FIG. 1 is a sectional view of a conventional keypad assembly of a portable terminal.
Figure 2:
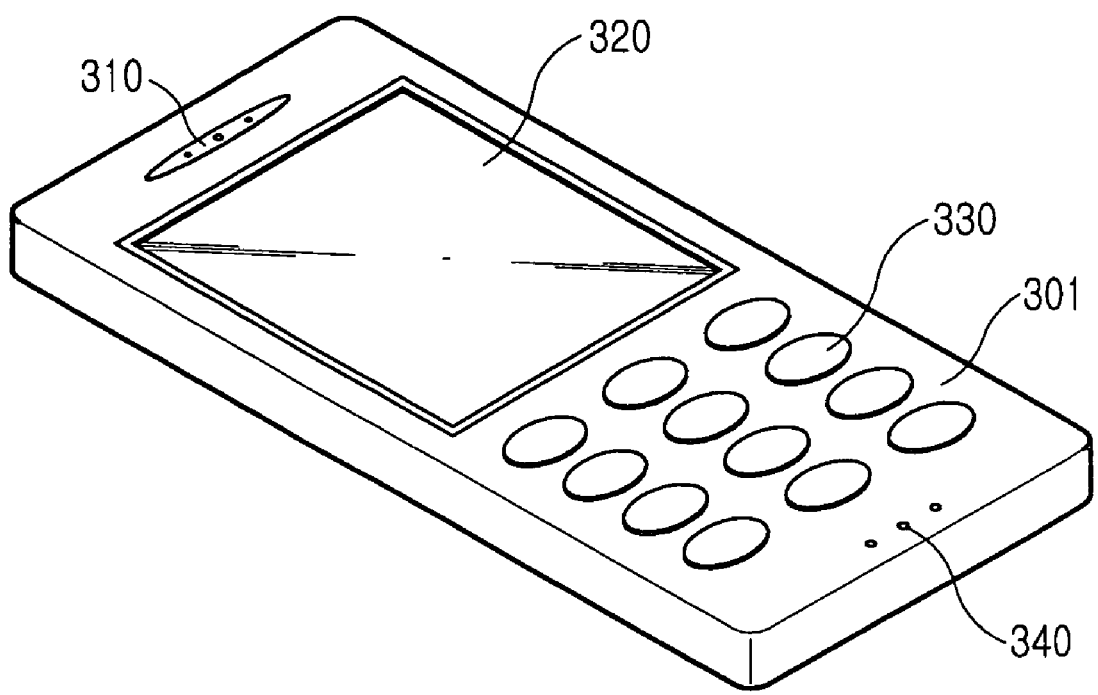
FIG. 2 is a perspective of a portable terminal having a keypad assembly according to an embodiment of the present invention.

FIG. 2 shows a portable terminal 300 having a keypad assembly according to the present invention. The portable terminal 300 includes a speaker 310, a display unit 320, a keypad assembly having a plurality of key buttons 330, and a microphone 340, which are arranged on an upper surface of the portable terminal 300. The key buttons 330 are protruding out of a casing 301 so that the top of each key button 330 is exposed. Therefore, a user can touch and push the top of the key button 330 to input data or activate the phone.

Figure 3:
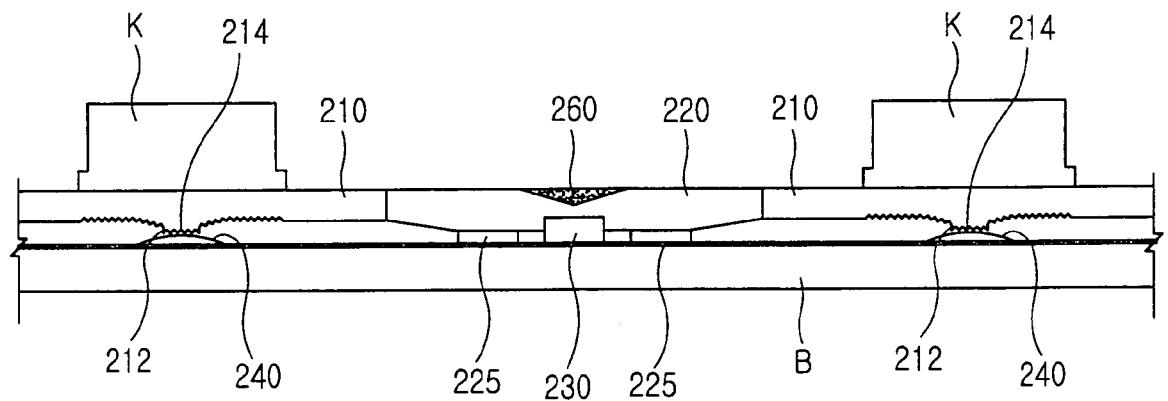
FIG. 3 is a sectional view of a keypad assembly for a portable terminal according to an embodiment of the present invention.

Referring to FIG. 3, the structure of a keypad assembly 200 according to the present invention will be described. As shown in FIG. 3, the keypad assembly 200 according to the present invention includes a keypad, a light source 230, spacers 225, switch portions 240, and a casing 250 (see FIG. 8).

More specifically, the keypad includes pad portions 210 provided with a plurality of key buttons K, a light guide plate 220 disposed between and in parallel with the pad portions 210, and a reflection unit 260 which directs light transmitted from the light source 230 toward each key button K. The pad portions 210 are made from materials having a high elasticity. The light guide plate 220 is preferably made of materials having a good transmittance in the visible ray region. The light guide plate 220 is made of the same material as that of the pad portion 210, and preferably is made of elastic silicon materials so that the light guide plate 220 can play the role as a part of the pad portion 210.

The reflection units 260 are disposed on an upper surface of the light guide plate 220, specifically, on portions corresponding to the key buttons arranged on the substrate. The positions of the reflection units 260 are determined based on the relative positions of the arranged key buttons K. This configuration causes the reflection units 260 to reflect the light to the pad portion 210 so as to give an entirely uniform brightness to the keypad. That is, the positions of the reflection units 260 are determined depending on the arrangement of the key buttons K deployed in the portable terminal. However, it is possible to locate the reflection units 260 at other positions that are not dependent on the arrangement of the key buttons K. For example, it is possible to locate the reflection units 260 at positions at which the reflection units 260 can direct a sufficient light toward the key buttons at the edge portions, which are relatively dark.

The respective reflection unit 260 may include a reflection mirror or a unit having a reflective coating layer with a high reflectance. The unit having the reflective coating layer may include a metallic material and a reflective coating layer coated on the metallic material. It is unnecessary to limit the reflection unit 260 to the reflective coating layer made of the metallic material, thus the reflection unit 260 may be made by preparing an inclined structure on the light guide plate and then coating a suitable material on the incline structure. The suitable materials include materials having a higher refractive index than the light guide plate. Each of the reflection units 260 has a triangular shape in section, which includes at least one inclined surface. That is, FIG 3 shows a cross section of the reflection units 260, but the reflection unit 260 is a conical shape. Accordingly, a light emitted from the light source 230 is transmitted by the conical reflection units in all directions. The reflection unit 260 has a reflective coating layer formed on the inclined surface facing the light source 230.

The light source 230 is disposed vertically below the reflection unit 260 and between the spacers 225 or between the key buttons K to emit the light toward the reflection unit 260 so as to give an entirely uniform brightness to the keypad. Of course, the light source 230 is locally disposed in a dark region of the keypad. It is preferred that a light emitting diode is used as the light source 230 in consideration of the lifetime and the environment. The dome switches 240 are metal dome switches, which apply electric signals to a processor as the user presses a key.

The pad portion 210 having the key buttons K further includes protuberances 212 to activate the dome switches 240. Each of the protuberances 212 includes a reflection pattern 214 to locally guide the light reflected by the reflection unit 260 toward each of the key buttons K. The region of the reflection pattern corresponds to the width of the respective key button K in order to transmit the reflected light to the key button K as much as possible.

The spacers 225 is disposed below the light guide plate 220 in order to support the light guide plate 220 spaced apart from the substrate B. The spacers 225 are made of the same material as that of the light guide plate 220. More specially, it is economical to integrate the spacers 225 with the light guide plate 220 using silicon material. However, some structure does not include the spacer 225 and can be separated from the guide plate 220. The spacers 225 supporting the light guide plate 220 may be used to adjust the height of the light guide plate 220 with respect to the pad portions 210. Thus, the size of the spacers may be changed according to its purpose. Further, the spacers 225 may be disposed near the dome switches 240, for example, below the pad portion 210 as well as the light guide plate 220.

Figure 4:
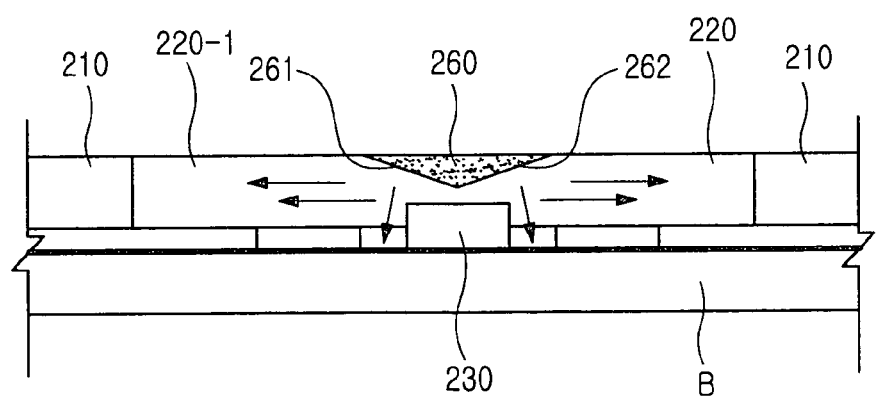
FIG. 4 is a sectional view of a keypad assembly for a portable terminal according to an embodiment of the present invention, in which a pad portion has the same thickness as that of a light guide plate.
Figure 5:
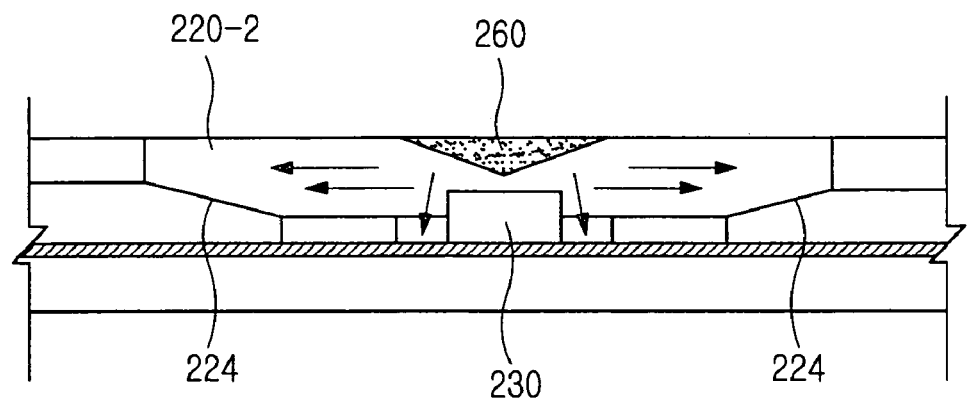
FIG. 5 is a sectional view of a keypad assembly for a portable terminal according to an embodiment of the present invention, in which the light guide plate has a tapered portion.

The reflection unit 260 as shown in FIGS. 3 to 5 has an isosceles triangular shape in a cross section, particularly a conical shape, which is comprised of a reflective mirror that a reflective layer is disposed on its surface. The FIGS. 3 to 5 show a cross section of the reflection unit with the first and second inclined surfaces 261 and 262.

The first and second inclined surfaces 261 and 262 are symmetric to each other and serve to direct the light from the light source 230 toward the key button K. However, it should be noted that the shape of the reflection unit 260 may have different shapes other than the triangular shape, specifically a conical shape. The reflection unit 260 may be formed in convex or concave shape having a certain curvature. Here, it is important that the reflection unit 260 must have a surface shape capable of preventing the light from the light source 230 from leaking out of the keypad and transmitting the light to the key button K as much as possible.

The light guide plate 220-1 shown in FIG. 4 has the same thickness as the pad portion 210 in the portion in contact with the pad portion 210.

Meanwhile, it should be noted that the light guide plate does not have to have the same thickness as the pad portion. Preferably, the light guide plate 220 is thicker than the pad portion 210 in order to prevent the light guided from the light source through the light guide plate 220 from leaking and transmit it to the pad portion 210 as much as possible.

FIG. 5 shows a light guide plate 220-2 having a tapered portion 224. In the case in which the light from the light source 230 is directed toward the pad portion 210 by way of the reflection unit 260, it is possible to transmit a large quantity of light when the light guide plate 220 is thicker than the pad portion 210 as described above. However, in this case, a discontinuity occurs at the connecting point between the pad portion 210 and the light guide plate 220, so it is necessary to prevent the loss of the light in advance. For this reason, the tapered portion 224 is provided to the light guide plate 220-2. That is, the tapered portion 224 can prevent the loss of the light in the discontinuity region due to a difference in the thickness between the light guide plate 220 and the pad portion 210.

Preferably, the above-mentioned light guide plate 220 may be formed integrally with the pad portion 210 and may be made of materials having low hardness, high elastic coefficient, high elastic recovery force, and high permeability, for example, silicon material or polyurethane material in order to play a role as the pad portion 210.

Figure 6:
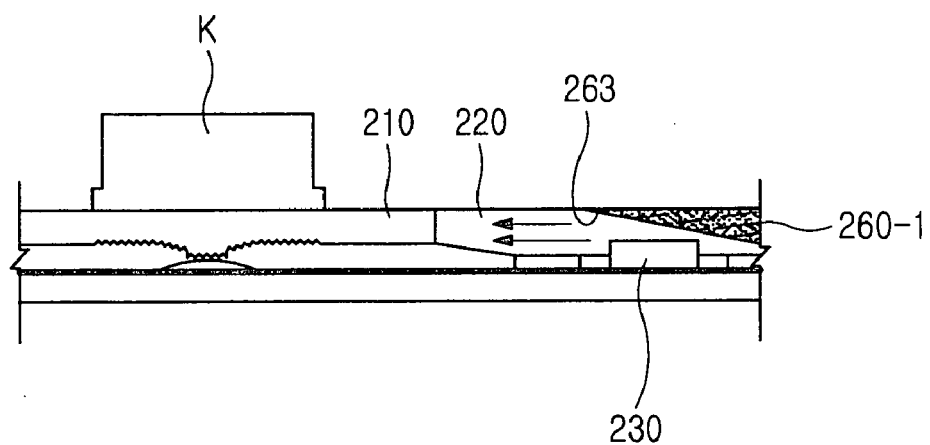
FIG. 6 is a sectional view of a reflection unit in a keypad assembly for a portable terminal according to another embodiment of the present invention.

In the keypad assembly having a plurality of key buttons K employed in the portable terminal, as shown in FIG. 6, the key buttons K-1 placed at the outer edge of the keypad may possibly darker during operation due to distance. Thus, it is desirable for the reflection unit 260-1 to reflect the light in only one direction for such key buttons. To address this problem, the reflection unit 260-1 having a right triangular shape in a cross section, specifically a semi-conical shape, with a single inclined surface 263 may be provided according to anther embodiment of the present invention. The FIG. 6 shows a cross section of the reflection unit having the right triangular shape. The single inclined surface 263 directs the light from the light source 230 toward the key buttons K-1. It should be noted that other functions, such as pad portion, switches, light guide plate, and light source, shown in FIG. 6 is omitted to avoid redundancy as they are already described with reference to FIG. 3.

Figure 7:
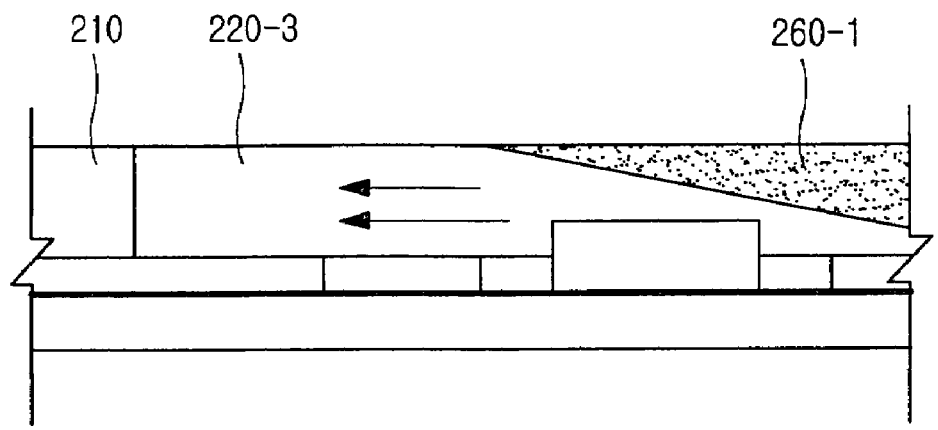
FIG. 7 is a sectional view of a keypad assembly for a portable terminal according to another embodiment of the present invention, in which a pad portion has the same thickness as that of a light guide plate.

The reflection unit 260-1 is disposed on the light guide plate 220-2, and more specifically is aligned vertically above the light source 230. Although FIG. 6 shows the light guide plate 220 and the pad portion 210 having different thicknesses from each other, it is possible that the light guide plate has the same thickness as the pad portion at the portion at which the light guide plate is in contact with the pad portion. FIG. 7 shows the light guide plate 220 and the pad portion 210 having the same thickness. In the case in which the light guide plate has a different thickness from the pad portion, the tapered portion as shown in FIG. 5 can be adopted for the light guide plate to minimize the light loss.

Figure 8:
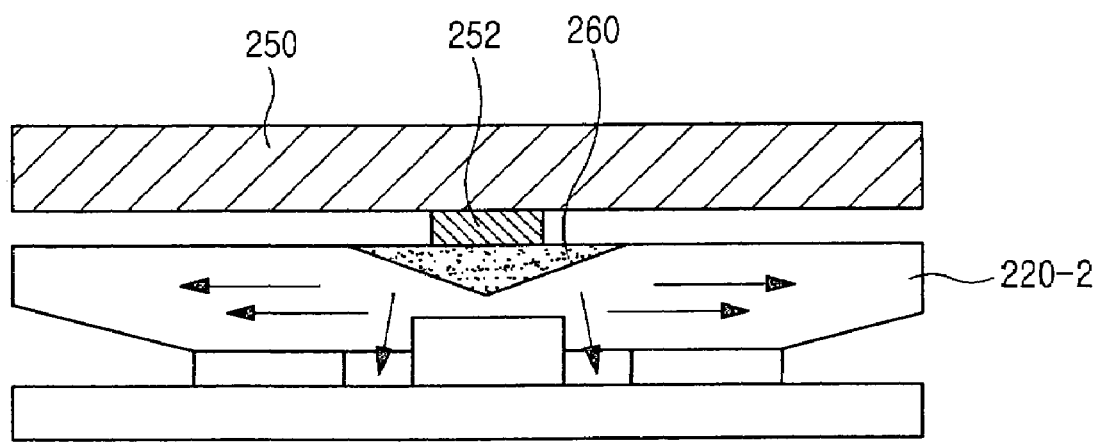
FIG. 8 is a sectional view of a keypad assembly, which is enclosed by a casing, according to the embodiment of the present invention.

Referring to FIG. 8, a casing 250 encloses and separates the keypad assembly from its outer environment. The casing 250 includes a protuberance 252 normally extending downward from an inner surface of the casing 250. The casing 250 may be integrally formed with the protuberance 252 by injection molding while the reflection unit 260 is attached to the protuberance 252 of the casing 250. Otherwise, the protuberance 252 and the reflection unit 260 may be independently made and then assembled in an assembling process.

Referring back to FIGS. 3–8, an operation of the lighting unit provided to the keypad assembly according to the teachings of the present invention will be described hereinafter.

As shown in FIGS. 4–8, the light from the light source 230 is mostly transmitted in a vertical direction of the light guide plate 220-2, while hardly transmitted in a horizontal direction of the light guide plate 220-2. Then, the light transmitted from the light source 230 is directed by means of the reflection unit 260 to the light guide plate 220-2, which in turn horizontally transmits the light toward the key buttons K. The light introduced to the light guide plate 220-2 in this way is subjected to a total reflection at the boundary between the light guide plate 220-2 and the reflection unit 260, so tat almost all of the light is transmitted through the light guide plate 220-2. When the light reflected by the reflection unit 260 reaches the reflection pattern 214, the transmission angle of the light exceeds the critical angle, so the light is refracted upward and emitted out of the pad portion 210. Here, the reflection patterns 214 arc coarsely formed at a site adjacent to the light source 230, while closely formed at a site far from the light source 230. Thereby, it is possible to ensure the entirely uniform brightness to the keypad.

As described above, the present invention can provide a keypad for a portable terminal with a uniform illumination. In addition, the present invention is provided with the reflection pattern to locally emit light to the key button. The light guide plate has the same thickness as the pad portion in the connecting region of the pad portion and the light guide plate, so as to minimize the light loss. As a result, the present invention allows the keypad assembly to have a small number of light emitting diodes (LEDs), resulting in a decrease in the numbers of the LED and in the reduction of manufacturing cost. Furthermore, the present invention can be applied to the region of the key buttons which are arranged at a side or at the edge of the pad portion having a relative darker area during operation, so as to provide a uniform illumination through out the key button regions mainly.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A keypad assembly for a portable terminal comprising:
    a keypad having a plurality of pad portions with a plurality of key buttons placed thereon, a light guide plates disposed between the pad portions, and a reflection units including a triangular shaped cross-section and being disposed on the light guide plates to direct light toward the key buttons;
    a light source configured to provide the light toward the reflection units;

a plurality of spacers disposed below the light guide plates, the spacers configured to separate the light guide plate from a substrate and to support the light guide plates; and a plurality of switches disposed below the pad portions under the key buttons, the switches configured to apply signal to the substrate.

2. The keypad assembly for the portable terminal as claimed in claim 1, wherein the reflection units comprises a reflective mirror.

3. The keypad assembly for the portable terminal as claimed in claim 1, wherein the reflection units includes a reflection coating layer.

4. The keypad assembly for the portable terminal as claimed in claim 1, wherein the reflection units is disposed on an upper portion of the light guide plate and wherein position of the light guide plate is determined according to an arrangement of the key buttons.

5. The keypad assembly for the portable terminal as claimed in claim 1, wherein the reflection unit has an isosceles triangular shaped cross section to direct the light from the light source toward each of the key buttons in all direction.

6. The keypad assembly for the portable terminal as claimed in claim 1, wherein the reflection unit has a right triangular shaped cross section to direct the light from the light source toward the key buttons.

7. The keypad assembly for the portable terminal as claimed in claim 1, wherein the light guide plate is made of same material as that of at least one of the plurality of pad portions to perform a function of at least one of the plurality of pad portions.

8. The keypad assembly for the portable terminal as claimed in claim 1, wherein at least one of the plurality of pad portions on which one of the plurality of key buttons is placed further includes a protuberance to activate at least one of the plurality of switches and further includes a reflection pattern to partially guide the light reflected by means of the reflection unit to the key buttons.

9. The keypad assembly for the portable terminal as claimed in claim 1, wherein the light sources are disposed between the spacers.

10. The keypad assembly for the portable terminal as claimed in claim 1, wherein thickness or the light guide plate is same as that of at least one of the plurality of pad portions.

11. The keypad assembly for the portable terminal as claimed in claim 1, wherein thickness of the light guide plate is larger than that of at least one of the plurality of pad portions.

12. The keypad assembly for the portable terminal as claimed in claim 11, wherein the light guide plate further includes a tapered portion at a region in contact with at least one of the plurality of pad portions in order to prevent light loss.

13. The keypad assembly for the portable terminal as claimed in claim 1, further comprising a casing, the casing including a protuberance integrally formed thereon, so as to bring the reflection unit into a close contact with the light guide plate.

14. The keypad assembly for the portable terminal as claimed in claim 13, wherein the reflection unit is attached to the casing.

15. The keypad assembly for the portable terminal as claimed in claim 1, wherein the spacers arc made of same material as that of the light guide plate and are integrated with the light guide plate.

16. The keypad assembly for the portable terminal as claimed in claim 1, wherein the light guide plate is made of silicon material.

17. The keypad assembly for the portable terminal as claimed in claim 1, further comprising a casing configured to enclose the keypad.

18. The keypad assembly for the portable terminal as claimed in claim 1, wherein the reflection unit has a conical shape.

19. The keypad assembly for the portable terminal as claimed in claim 1, wherein the reflection unit has a semiconical shape.

20. The keypad assembly for the portable terminal as claimed in claim 1, wherein the reflection unit is configured to reflect a portion of the light input from the light source in a direction parallel to a surface of the at least one of the plurality of pad portions on which one of the plurality of key buttons is placed.

* * * * *